(12) United States Patent
Pastor Perales et al.

(10) Patent No.: US 11,301,778 B2
(45) Date of Patent: Apr. 12, 2022

(54) METHOD AND SYSTEM FOR TRAINING AND VALIDATING MACHINE LEARNING IN NETWORK ENVIRONMENTS

(71) Applicant: TELEFONICA, S.A., Madrid (ES)

(72) Inventors: Antonio Pastor Perales, Madrid (ES); Diego R. Lopez, Madrid (ES); Alberto Mozo Velasco, Madrid (ES); Sandra Gomez Canaval, Madrid (ES)

(73) Assignee: TELEFONICA, S.A., Madrid (ES)

( * ) Notice: Subject to any disclaimer, the term of this patent is extended or adjusted under 35 U.S.C. 154(b) by 546 days.

(21) Appl. No.: 16/359,336

(22) Filed: Mar. 20, 2019

(65) Prior Publication Data

US 2019/0294995 A1    Sep. 26, 2019

(30) Foreign Application Priority Data

Mar. 21, 2018 (EP) .................................. 18382188

(51) Int. Cl.
*G06N 20/00* (2019.01)
*G06N 5/04* (2006.01)
(Continued)

(52) U.S. Cl.
CPC ............... *G06N 20/00* (2019.01); *G06N 5/04* (2013.01); *H04L 41/16* (2013.01); *H04L 43/026* (2013.01); *H04L 43/028* (2013.01); *H04L 43/067* (2013.01); *H04L 43/12* (2013.01); *H04L 41/14* (2013.01); *H04L 47/10* (2013.01)

(58) Field of Classification Search
CPC .......... G06N 5/04; G06N 20/00; H04L 41/14; H04L 41/16; H04L 43/026; H04L 43/028; H04L 43/067; H04L 43/12; H04L 47/10; Y02D 30/50
See application file for complete search history.

(56) References Cited

U.S. PATENT DOCUMENTS 8,682,812 B1    3/2014 Ranjan
9,813,310 B1 *  11/2017 Sieracki .................. H04L 43/18
(Continued)

OTHER PUBLICATIONS

Thuy TT Nguyen et al.: A Survey of Techniques for Internet Traffic Classification Using Machine Learning:, IEEE Communications Surveys and Tutorials, Institute of Electrical and Electronics Engineers, US, Vo., 10, No. 4, Oct. 1, 2018, pp. 56-76.
(Continued)

*Primary Examiner* — Thomas J Dailey
(74) *Attorney, Agent, or Firm* — Kinney & Lange, P.A.

(57) ABSTRACT

A system and method for training and validating ML algorithms in real networks, including: generating synthetic traffic and receiving it along with real traffic; aggregating the received traffic into network flows by using metadata and transforming them to generate a first dataset readable by the ML algorithm, comprising features defined by the metadata; labelling the traffic and selecting a subset of the features from the labelled dataset used in an iterative training to generate a trained model; filtering out a part of real traffic to obtain a second labelled dataset; and selecting a subset of features from the second labelled dataset used for validating the trained model by comparing predicted results for the trained model and the labels; repeating the steps with a different subset of features to generate another trained model until results are positive in terms of precision or accuracy.

15 Claims, 6 Drawing Sheets

(51) Int. Cl.
*H04L 43/026* (2022.01)
*H04L 43/028* (2022.01)
*H04L 43/067* (2022.01)
*H04L 43/12* (2022.01)
*H04L 41/16* (2022.01)
*H04L 41/14* (2022.01)
*H04L 47/10* (2022.01)

(56) References Cited

U.S. PATENT DOCUMENTS

| | | |
|---|---|---|
| 10,061,578 B2 * | 8/2018 | Walsh ............... G06F 8/20 |
| 10,375,090 B2 * | 8/2019 | McGrew ............ G06N 20/00 |
| 10,904,275 B2 * | 1/2021 | Anderson ......... H04L 63/1458 |
| 2014/0090058 A1 | 3/2014 | Ward et al. |
| 2016/0105364 A1 | 4/2016 | Kanonakis et al. |
| 2016/0283859 A1 | 9/2016 | Fenoglio et al. |
| 2018/0007578 A1 | 1/2018 | Drabreck et al. |
| 2018/0219889 A1 * | 8/2018 | Oliner ............... G06N 3/04 |

OTHER PUBLICATIONS

European Search Report dated Sep. 3, 2018, for corresponding European Application No. 18382188.
Extended European Search Report dated Sep. 7, 2018, received for corresponding European Application No. 18382188.3.
Thuy T.T. Nguyen and Grenville Armitage, A Survey of Techniques for Internet Traffic Classification Using Machine Learning, 21 pages, vol. 10, No. 4, Fourth Quarter 2008.

* cited by examiner

METHOD AND SYSTEM FOR TRAINING AND VALIDATING MACHINE LEARNING IN NETWORK ENVIRONMENTS

CROSS-REFERENCE TO RELATED APPLICATION(S)

The present application claims priority to European Application No. 18382188.3 filed on Mar. 21, 2018, the entire content of which is incorporated herein by reference in its entirety.

TECHNICAL FIELD

The present disclosure has its application within the telecommunication sector, and more specifically, relates to the analysis of data streams and network traffic flows using machine learning (ML).

More particularly, the present disclosure refers to a method and system for training and validating machine learning algorithms based on network data collected in real network environments.

BACKGROUND

Traffic categorization and network analytics are much demanded tools nowadays. Technologies for analytics include the use of Deep Packet Inspection (DPI) and contextual information (domains, IPs, etc.). Currently there exist multiple tools and libraries to capture and store network traffic data. Some of them are as detailed as packet by packet dumps (e.g. libpcap libraries, or tcpdump tools), and others summarize the information in flows of data at different OSI levels (e.g. netflow, sflow protocols, or ntop tool).

Nonetheless, the existing solutions do not scale and do not solve completely the traffic categorization problems. The automated categorization process is getting more complicated year after year with increasing encrypted traffic (>70% of Internet) and the evolution of privacy regulations. The application of machine learning (ML) to traffic classification is a feasible solution, able to use network flow information (e.g. netflow), available and scalable, as the data source.

Two main categories of ML algorithms are commonly accepted: Supervised and unsupervised. First ones require labelling the data and a controlled environment to perform training, meanwhile the second ones are trained over a baseline and no labelling is needed in the data used (but needed anyway for validation and performance). Examples of unsupervised ML are oneClassSVM, k-NN; meanwhile for supervised ML algorithms are Random Forest or Bayesian networks.

The programmatically implementation of the ML algorithms is based on open-source libraries and open-source code, which is an area continuously expanding, and specially focused on developing and testing new ML algorithms. Some libraries and languages programing relies on others. Some examples are: the Python or R languages, or the Keras, TensorFlow, and Theano libraries. The main role of these libraries and languages is to simplify and add an abstraction layer to help in code development.

Generic trainer services to train ML algorithms, as well as open source tools for programming and testing ML, exist in the market. Some of them have been released as commercial products:

Cloud services: Amazon Web Services (AWS) for Machine Learning or Azure Machine Learning, among others, offer cloud services (CPU, memory, disk) where to upload datasets, and also a set of open source libraries where to make training and validation, and finally create services. They also offer a service with pre-trained algorithms in some specific areas (vision, natural language), but as a tool to send data and obtain a result. These solutions are dataset-type agnostic and not directly related to network scenarios, and always expect you provide the data.

Applications in network monitoring tools: Splunk ML toolkit, ELK X-Pack or Apache Spot are software applications focused on event (not only network flow events) collecting. They extend their capacity with some ML algorithms. In this case, they offer algorithms to be applied to the data stored in their products on the events collected so far, but not considering training for supervised learning, only anomaly or statistical models. Synthetic traffic generation, labelling and training is not supported in their framework.

However, there are several problems in the aforementioned ML trainer products: Cloud service format (AWS, Azure, etc.), are agnostic to the provided data an only provide algorithms to train. These products assume that the dataset is tailored to your needs, instead of creating and providing this dataset. They also have the inherent problem that they expect that the data will be labelled in supervised ML, and cannot provide a solution for labelling. In the case of applications in network monitoring tools, they solve the data source problem (using the events collected), but no synthetic traffic are considered, neither the labelling dataset process, limiting most of them to unsupervised ML algorithms.

There are also patent documents on machine learning algorithms applied in network data processing that can be mentioned here:

U.S. Pat. No. 8,682,812B1 uses historical network data from botnet activity to train a ML algorithm and later uses the trained algorithm to detect in real time traffic the botnet using the ML algorithm. The data is generated and designed dynamically for training in real time at the same time that the real traffic is being used.

US20160105364 uses ML algorithms to classify traffic, using network flows, also allowing the dynamic modification of the ML algorithms and their features (the information used from the network flow) in response to predefined thresholds detected in the network data in use. Additionally, US20160105364 proposes to use Software Defined Networking (SDN) tools to modify the data feature selection (not to generate new ones) for the training. There is no mention on how to label the traffic for training, so unsupervised ML algorithms are used.

US20140090058 proposes network traffic specific data selection and comparison, from real traffic malware and malware simulation. Both data sources are compared with statistical similarities and with an automatic behavioural of the software, giving a confidence index. A simulation for specific applications (malware) is created but it does not support other type of traffic activities. The confidence index is based on defined rules (statistical thresholds), which should be supervised and programmed.

US20160283859 defines a network traffic classification method bases on a modified version of netflow ("flexible netflow") for traffic flow capture and video content identification, using ML algorithms. This solution is centered on the classification problem and focused on the use of ML algorithms to video-specific classification tasks, and relies on a preexisting training database, without no injection or dynamic labelling capacity. The handicap of this solution is that the described model is limited in the training capacity. For example, a simple change in the base transport protocols, the application version, or the evolution of video codecs, requires a new training database. Neither the labeled dataset availability nor the labeling problem is resolved. Today deep learning training (Deep learning is an advanced model of neural networks that allows the extraction of hidden features in the data fed to them) techniques require high computational capacity and a huge labeled dataset to achieve valid results, but this data is not easily available and even less in labeled form. Also, in the classification problem, the past related traffic is not used in US20160283859, losing valuable information.

Summarizing, here are several problems in prior-art solutions:

- Traffic related info, aggregated by several packet fields exist in the state of the art (Netflow, flexible Netflow, sflow, Jflow, between others), but in all cases the information has two limitations: the information is generated only when the flow aggregation ends (e.g. a TCP session ends) or a timeout is triggered. Also, the information included is strictly limited to the information on the packets of the specific flow.
- Labelled public network data is unavailable or restricted. The labelling process is complicated and usually a manual activity. Also, network data availability is limited for any machine learning activity.
- One additional non-solved problem happens when thinking in terms of algorithms that need traffic profiles or behaviors, such a baseline traffic or percentage of the target traffic, to identify. For example, if an anomaly detector is required, the baseline traffic of the network is needed.
- ML algorithms give better results for specific problems. Tailored setups and training are needed: change the traffic environment conditions, the type of protocols, the volume and distribution of the traffic. For example, classification applications running over HTTP, require a totally separate training and validation setup than a specific botnet family detection. Also, a decision can be to inject a 10% of the traffic for an expected HTTP category, but just 1% for a botnet activity. This versatility is commonly solved in labs or controlled environments, but only validated later in production or real environments. When the algorithms fail in performance, they must be re-trained in labs and updated.

Therefore, the state of the art shows a clear need for providing services to train ML algorithms which make use of the network data analysis over real environments deployed in a network.

SUMMARY

The present disclosure may solve at least some of the aforementioned problems and overcome previously explained state-of-art work limitations by providing a method and system to train and validate Machine Learning algorithms based on network data analysis. The present disclosure supports the validation of any type of machine learning algorithms as it is highly configurable by using different synthetic traffic patterns, mixed with real network traffic. Real traffic is obtained by integrating the system in a real network environment, meanwhile synthetic traffic is generated with a "user synthesizer". The system further includes a probe model for feature extraction and generation, a labelling component that combines the collected traffic with the metadata produced by the "user synthesizer" and also allows the enhancement of the training process.

A first aspect of the present disclosure refers to a method for training and validating machine learning algorithms in real network environments, which is based on network data and comprises the following steps:

generating synthetic traffic and receiving packets comprising the generated synthetic traffic and the real traffic of the network;

aggregating the packets into network flows by using metadata;

transforming each network flow to generate a first dataset, with a format readable by a ML algorithm, which comprises features defined by the metadata for each network flow;

labelling the real and the synthetic traffic to obtain a labelled dataset which comprises the first dataset and additional features defined as labels, wherein the labelling is done by matching features from the first dataset and features generated by the real and synthetic traffic, and, if there is no match, assigning an unknown label;

selecting a subset of the features from the labelled dataset to be used in an iterative training to generate a trained model;

filter out a part of real traffic of the labelled dataset to obtain a second labelled dataset;

selecting a subset of features used in the trained model from the second labelled dataset to be used for validating the trained model;

comparing predicted results for the trained model and the labels obtained from labelling; and, if the comparison is negative, repeat the previous steps with a different subset of features to generate another trained model.

A second aspect of the present disclosure refers to a system configured to implement the method described before by comprising the following components:

at least one generator of synthetic traffic or synthesizer, in charge of generating traffic patterns according to the planned nature of the data to be generated;

a probe configured for receiving the packets through a network device, aggregating them into network flows by using metadata; and transforming each flow to generate a first dataset readable by a ML algorithm comprising features defined by the metadata for each flow;

a train and validation module, comprising a labeller and a feature extractor able to collect information from the packets in the traffic flows as they arrive, configured for:

i) labelling the received packets of real and synthetic traffic by the labeller, which takes the flow data and marks them according to previous knowledge applied by the synthesizer and other elements in the network environment;

ii) selecting by the feature extractor a subset of the features from the labelled dataset to be used in an iterative training to generate a trained model;

iii) filtering out (by the feature extractor a part of real traffic of the labelled dataset to obtain a second labelled dataset;

iv) selecting by the feature extractor a subset of features used in the trained model from the second labelled dataset to be used for validating the trained model;

v) comparing the results for the trained model and the labels; and, if the comparison is negative, repeating steps i)-v) with a different subset of features to generate another trained model, the feature extractor associating the collected information with the corresponding flow and updating the data associated with the flow.

The method and system in accordance with the above described aspects of the disclosure has a number of advantages with respect to the aforementioned prior art, which can be summarized as follows:

Regarding U.S. Pat. No. 8,682,812B1, network flows and the training of ML algorithms are analyzed and the historical network data can be considered similar to synthetic traffic, but there is a clear difference from the present disclosure: the data is generated and designed dynamically for training (synthetic traffic) in real time at the same time that the real traffic is being used. Technically the present disclosure exposes the ML training process to a variable environment to make more accurate the algorithm learning process.

Regarding US20160105364, the critical difference is that the present disclosure can force the change of network data at generation in the network, rather than in the data feature selection process, which happens in algorithm training. This allows the present disclosure not to depend only on real traffic conditions, but to be able to produce new situations based on synthetic generation. Since it is based on changing traffic generation, the present disclosure is able to provide labels as traffic patterns changes, unlike US20160105364 in which no labelling process is disclosed.

US20140090058 cannot be generalized to other activities, beyond the malware captured and simulated. The present disclosure expands the capacity to synthetize any type of network traffic needed with a simultaneous mix of (real and synthetic) traffic in real time (no need to wait for a malware sample capture). ML Algorithms are based on self-learning and not in statistical thresholds, which requires manual adjustment to obtain a good confidence. The present disclosure has the advantage of being able to change the quantity of real traffic to use, or to vary the synthetic traffic, so it is not attached to follow the specific behaviour defined by the malware sample.

The use of the proposed system allows huge quantity of historical data with labels (labelling module) for ML algorithms to be stored. This stored data can be reused, and updated iteratively to explore, characterize and improve the application of machine learning algorithms.

This disclosure uses the metadata produced from the network environment (layouts, services), from the synthetic generation (generation application logs), and collaborative real user (logs from real user activity) to automatize the labelling process.

The present disclosure performs all the processes in a realistic environment, able to dynamically adapt the training and validation process with real traffic.

This disclosure provides a real-time feature array generation with a very few packets, solving the problem of the information being generated only when the flow aggregation ends or a timeout is triggered. Also, the present disclosure solves the limitation of the available information, since the probe of the described system is able to produce related metadata for each flow that includes information of similar previous flows in a time window, to enrich the features available for the ML algorithms. For example, one flow aggregated (by source IP, destination IP, source port, destination port, TCP sequence number) can add features that include the number of similar aggregated flows and the median value of the bytes transmitted per flow in the last 30 minutes time window. This advantage of availability of dynamic information from historical flows, is important because of the increasing ML algorithms performance, especially in the deep learning area where hidden intricate structures of changing data flows (network flows) need to be discovered, and dynamic changes in the network (synthetic and real) will improve the algorithms capacity to identify the inner structures.

These and other advantages will be apparent in the light of the detailed description of the disclosure.

BRIEF DESCRIPTION OF THE DRAWINGS

For the purpose of aiding the understanding of the characteristics of the disclosure, according to a preferred practical embodiment thereof and in order to complement this description, the following Figures are attached as an integral part thereof, having an illustrative and non-limiting character.

DETAILED DESCRIPTION

Figure 1:
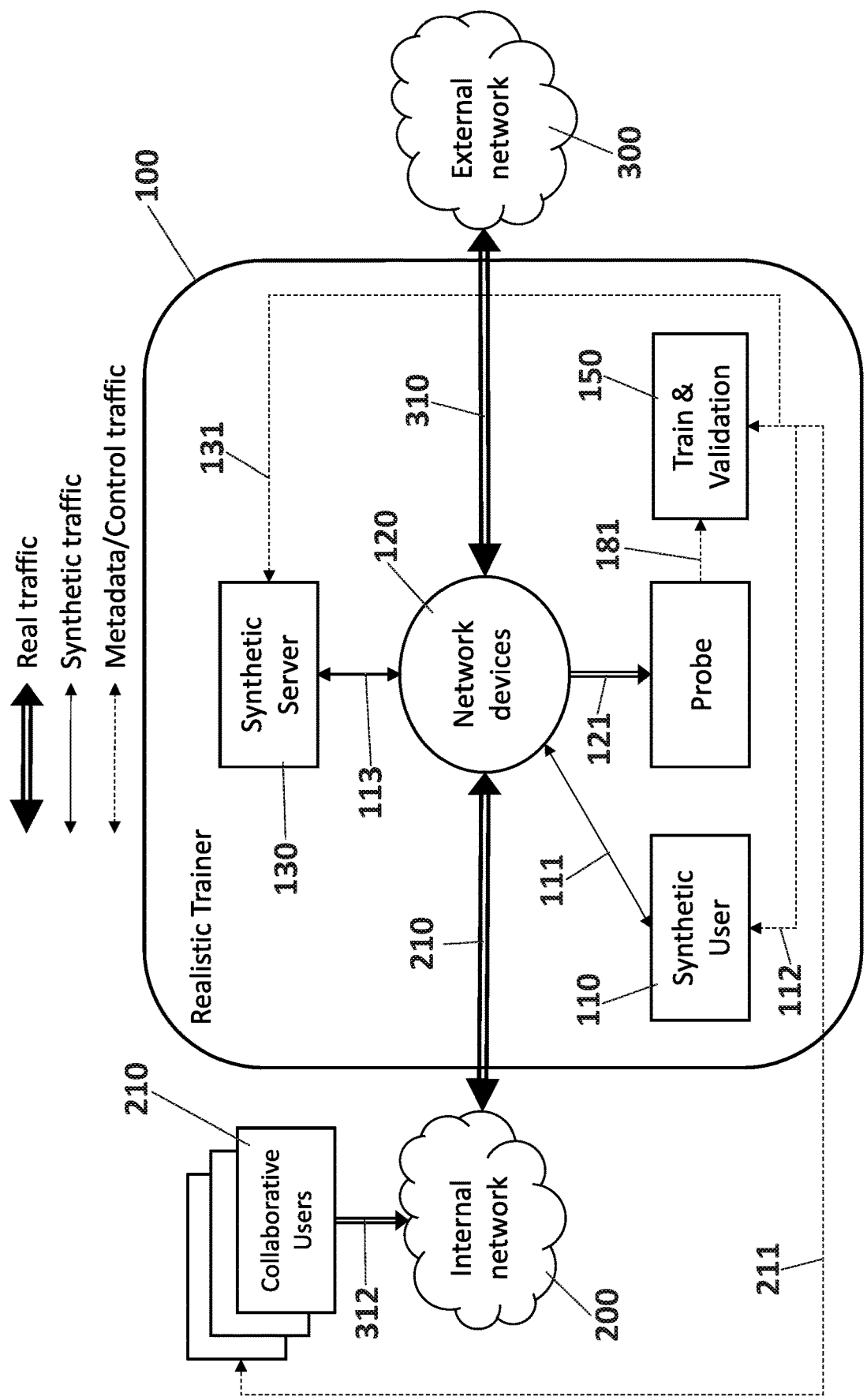
FIG. 1 shows a system for training and validating machine learning in a network environment of a real application scenario, according to a preferred embodiment of the disclosure.

The matters defined in this detailed description are provided to assist in a comprehensive understanding of the disclosure. Accordingly, those of ordinary skill in the art will recognize that variation changes and modifications of the embodiments described herein can be made without departing from the scope and spirit of the disclosure. Also, description of well-known functions and elements are omitted for clarity and conciseness.

Of course, the embodiments of the disclosure can be implemented in a variety of architectural platforms, operating and server systems, devices, systems, or applications. Any particular architectural layout or implementation presented herein is provided for purposes of illustration and comprehension only and is not intended to limit aspects of the disclosure.

The main implementation of the disclosure is the capacity to train and validate different types of ML algorithms in a specific network environment using a mix of real traffic with synthetic traffic to solve a specific problem, but there are some other applications/problems that the present disclosure can solve:

Evolving application identification: if a new application with unknown specific protocol(s), usually encrypted, needs to be identified, setting up the new application in the synthetic module and being used by collaborative user module, the present disclosure allows a set of supervised classification ML algorithms to be trained over the network and validated until the performance to identify this new application is acceptable. New versions of the application can be validated and if it is needed, re-trained, by just updating the synthetic and collaborative modules. The updated algorithms take less time to identify the new application than a start from the beginning. One specific case of algorithm training can be deep learning, where the inner weights of the neural network converge faster than in another environment.

Malware family detector: Network activity of malware is usually detected by predefined rules or abnormal traffic. This disclosure can load in the synthetic and collaborative user module, a piece of malware and deceive it with the synthetic Server (typically acting as a honeypot server), allowing to collect the malicious traffic in a controlled way in the real environment. Therefore, the present disclosure can be used to train and validate the detection of malware. Indeed, an advanced version could be trained with different samples of the same malware family, to identify current and future variants.

An additional embodiment of the present disclosure implements a test performance and robustness of different ML algorithms in a network environment. In this case, the synthetic user, collaborative user and Server, can also be used to inject noise to evaluate performance of multiple algorithms. In this model multiple Train & Validation models can be implemented in parallel with different ML algorithms and feature selection, and identify the best one under similar conditions.

FIG. 1 shows the architecture and main elements of a system (100) for training and validating Machine Learning, ML, based on network data analysis over real environments. The system (100) is called here, from now on, a Realistic Trainer, RT, and is deployed in a network environment which is split between internal network (200) and external network (300). Internal network (200) encloses the devices and users whose traffic is to be trained, monitored and identified, e.g. company intranet, access Internet Service Provider network, industrial factory network. External network (300) refers to all kind of services, devices or users, including general Internet services, corporate central services, or any other kind of systems, which are outside of the control where the RT system (100) is implemented.

The system (100) deals with three types of traffic:
i) The real traffic (210, 310), preexisting on the network environment, bidirectional between the internal network (200) and external network (300). This real traffic (210, 310) is somehow partially known, based on state of the art traffic inspection technologies, e.g. DPI, such as, ports, public IPs address, protocols or payload inspection (when possible), but not all traffic is identifiable by traditional technologies. Encryption, proprietary protocols, tunneling, new protocols versions, etc., make impossible to fully identify the real traffic (210, 310). This real traffic (210, 310) crosses through one or more network devices (120) and the real traffic (210, 310) is copied and sent to a Probe Module (140) of the RT system (100).
ii) The synthetic traffic (111, 113) is artificially generated by the RT system (100) and therefore allows the system (100) to have an unmistakable identification, thanks to a third type of traffic defined as follows, the metadata. Synthetic traffic (111, 113) can be produced on demand for any kind of need of the training process, using original applications, or other emulation tools. This synthetic traffic (111, 113) behavior can be defined to cover the ML training and validation process necessities. A Synthetic User Module (110) produces initial synthetic traffic (111). For some type of synthetic traffic, for example, synthetic web application service content delivery, bidirectional interaction is needed between the Synthetic User Module (110) and a synthetic server (130), producing additional synthetic traffic (113).
iii) The metadata traffic (112, 131), includes traffic-related data which can include IP source and destination, source and destination port, IP TCP sequence numbers, protocol, starting time, end time, duration, protocol options and flags, statistical information from the traffic, aggregated by any of them and historically (e.g. number of packets, number of bytes, number of packets with TCP ACK flag in last minute, etc.), and any other metadata not mention here that can be extracted from network traffic packets. This is the information to be translated into Machine Learning readable features. One specific type of metadata traffic (112, 131), in the case of synthetic traffic (111, 113), is the set of traffic categories, application names, and any other relevant information added from the synthetic traffic generators, which help the labelling process for training ML algorithms. FIG. 1, also shows one possible alternative for using a collaborative user module (210) and metadata (211) to help with part of the real traffic (312) in the labelling process by a Train and Validation module (150) of the RT system (100).

Figure 2:
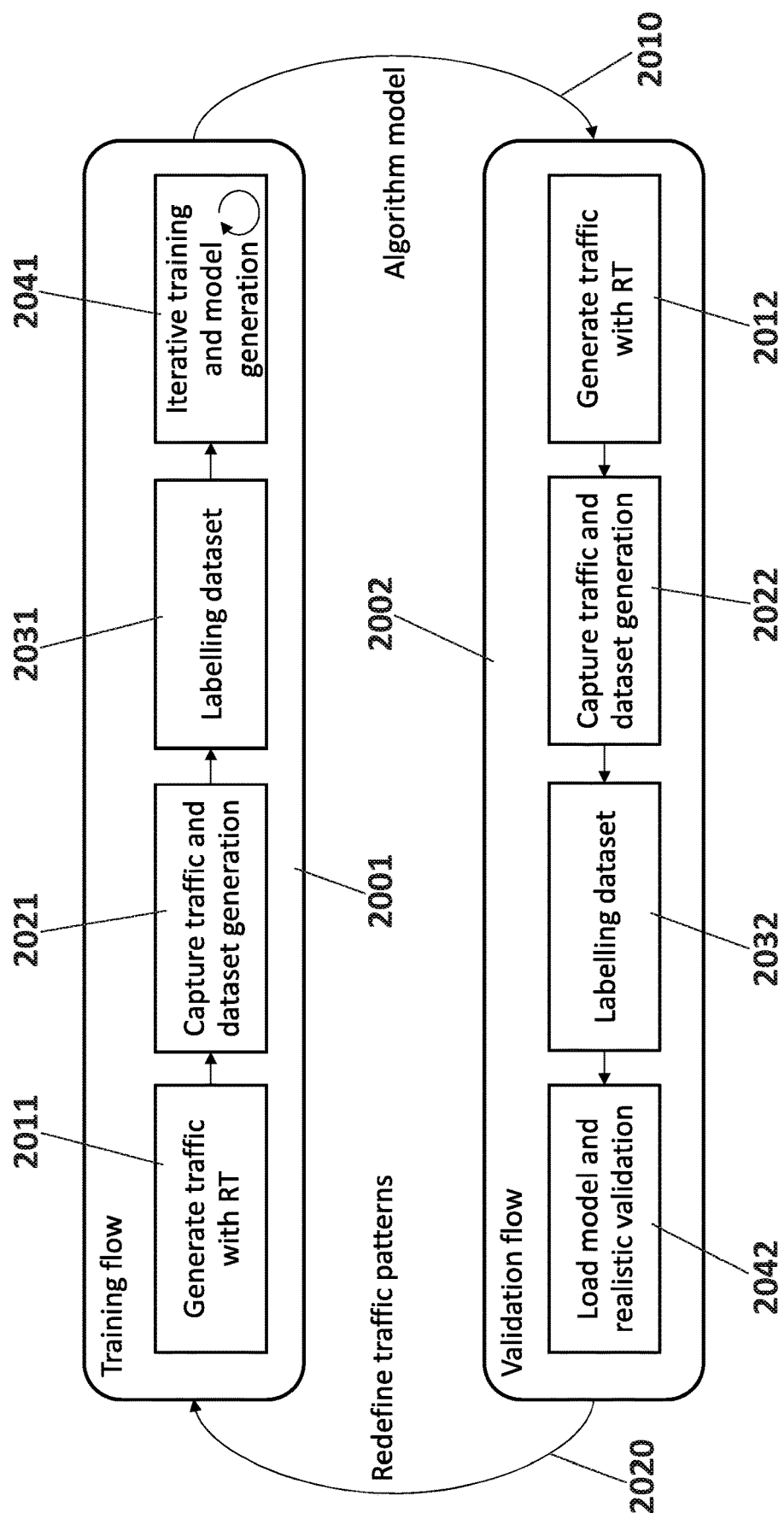
FIG. 2 shows a workflow of the system for training and validating machine learning in network environments, according to a possible embodiment of the disclosure.

FIG. 2 represents the RT system (100) in action, conceived as a cycle of workflows, a training workflow (2001) and a validation workflow (2002), iteratively performed until the ML algorithm fits in the real environment to solve the problem identified: traffic classification, anomaly detection, etc. The iterative process starts with the training workflow (2001) that generates (2011) synthetic and real traffic, which is captured and transformed to generate (2021) a dataset, the dataset being labelled (2031) to be used by ML algorithms, and then input into an iterative training (2041). This training step (2041) can involve multiple iterations with the same data, and so no new generation is needed, to choose the potential best algorithms, based in the features creation and selection. The final output is a tentative trained model (2010) to be validated in the same RT environment. The validation workflow (2002) generates (2012) again new traffic, this time with higher volume of real traffic, and using the synthetic traffic as reference traffic for validation. The generated traffic is captured and transformed again to be used in the generation (2022) of the dataset, which is labelled (2032) and used in the realistic validation process (2042) of the loaded model. Negative results require a ML model re-design and therefore new training workflow; for example, if a new application in the market or a new malware family appears.

The detailed steps in the aforementioned workflows, training workflow (2001) and validation workflow (2002), are described as follows:

Training workflow (2001): On an initial state, in a live network the traffic is moving between internal network (200) and external network (300). This real traffic (210,310) crosses through one or more network devices (120) and is copied and delivered to the Probe Module (140). Alternative implementations can imply that the probe module (140) can be part of the network devices (120). The training process starts with the Synthetic User Module (110) producing synthetic traffic (111) and the associated metadata (112) about what kind of traffic is generated. For some type of synthetic traffic services, bidirectional interaction is needed with the synthetic server (130) and additional synthetic traffic (113). This bidirectional process also produces extra metadata (131), increasing metadata available for the synthetic flows interactions. The Probe module (140) captures, extracts, transforms and enriches metadata from the received traffic (121), including real and synthetic traffic, delivered by one or more network devices (120). This created information in a suitable form for ML algorithms by the Probe module (140), usually an array of features, is injected by an interface (181) into the Train and Validation Module (150). Depending on the ML algorithm needs in the Train and Validation Module (150), labelling with metadata (112,131) and sampling of the features are steps chosen to be performed, before triggering the training. When the training process is considered successful, the Validation workflow (2002) is triggered.

Validation workflow (2002): Once the ML algorithms have been trained, the Train and Validation Module (150) defines the validation experiment template to be implemented in the Synthetic User Module (110). This template can define the type of traffic, duration, volume of packets, and any other parameters that define a traffic behavior. Also include a number of iterations that can cover different periods of time with different real traffic situations. The template is loaded and the process is similar to the previous training, traffic capture, feature extraction, and data features imported into the Train and Validation Module (150), where the algorithms goes through each of the iterations to obtain the validation results. In order to help in the Labelling process of the Train and Validation module (150), an alternative of implementation is using a collaborative user module (210) and the metadata interface (211). The Collaborative user module (210) runs into the devices of the internal network (200), e.g. a web browser, a mobile application, or any device with resources to execute the module. In this case, the collaborative user module (210) generates the metadata info from real users. This metadata is produced by the user normal behavior in the networks (e.g. web browsing). This way, collaborative user traffic can be labeled with the metadata information, following the same process as synthetic traffic labelling. This alternative allows the Validation workflow (2002) to obtain labeled datasets from real users as needed.

Figure 3:
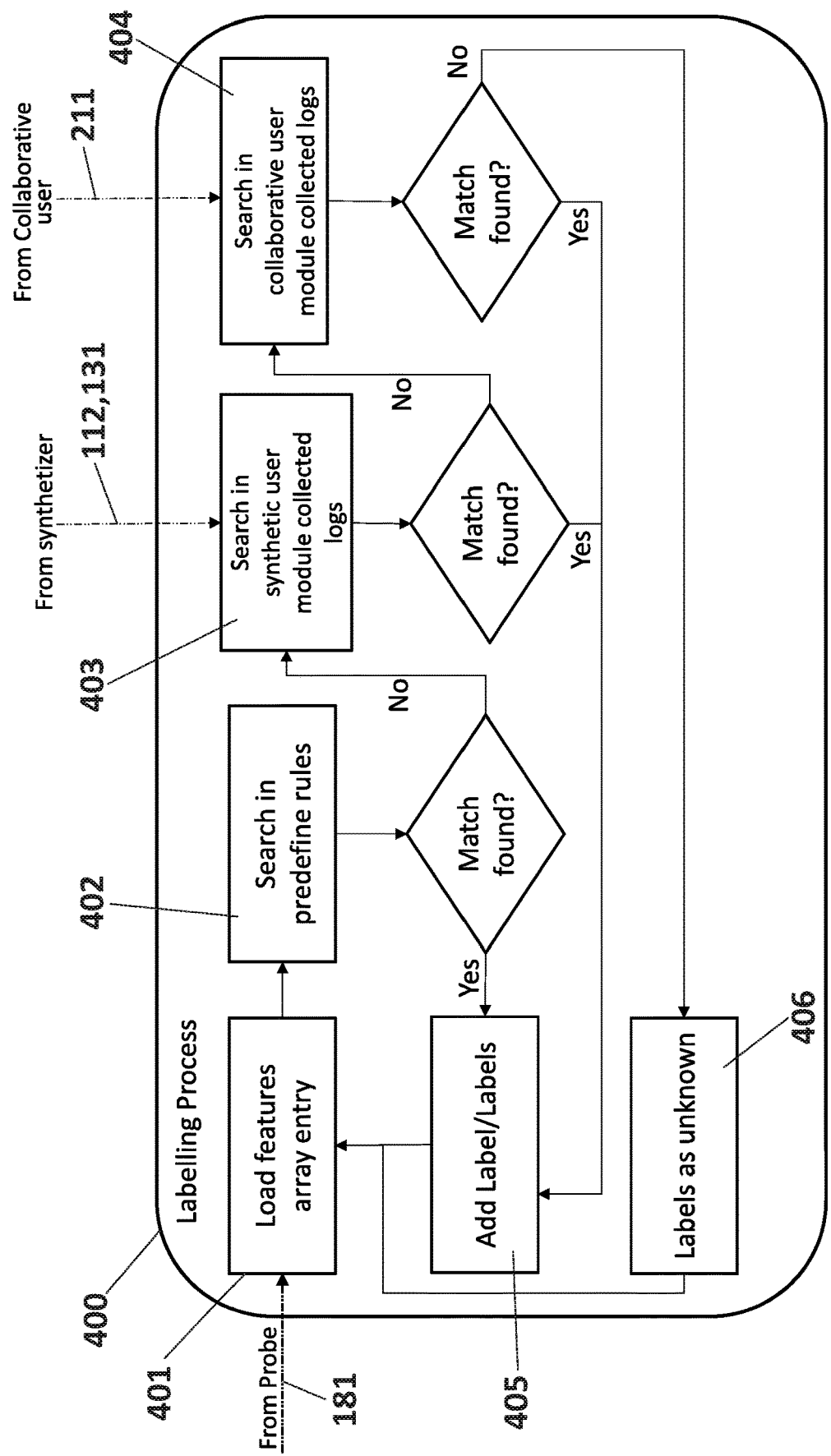
FIG. 3 shows a flow diagram of the labelling process in the Train and Validation Module of the system, according to a possible embodiment of the disclosure.

FIG. 3 shows the labelling process (400), which happens in the Train and Validation Module (150) and mostly apply to synthetic traffic, but not exclusively. The labeling is a key component for Machine Learning supervised families and for all kind of algorithms validation (comparing the predicted results with the original label) and consists in including one or more additionals features in the array for each network flow that describe or categorize it. The labelling process (400) starts by loading (401) an initial feature array through an interface (181) from the Probe (140) of the system (100). A sequential search process is then done. A first search (402) is done in a predefined and deterministic rule list that is based on any of the types of features. Some examples of deterministic rule can be assigning the label "DNS" for a list of known IP addresses provided by a DNS service, or assigning label "SNMP" for protocol transport UDP and the destination port 162. This process does not need metadata info from external modules. If this first search (402) failed, the process is repeated in a second search (403) and a third search (404) with metadata information, metadata (112,131) collected from synthetic client/server modules (110, 130) and optionally metadata (211) the collaborative user module (210) respectively. In both cases, the logs collected, include the label and a set of associated features. Some examples can be a log file with the label "Streaming", IP source, IP destination, protocol, port and timestamp This sequential process of search and match add the labels to the array of features (405) for all the synthetic traffic and part of the real traffic found in searches (402,404). The remaining real traffic is labelled as unknown (406) and not used in the training workflow (2001); this "unknown" label is needed as it is used in the validation workflow (2002).

Figure 4:
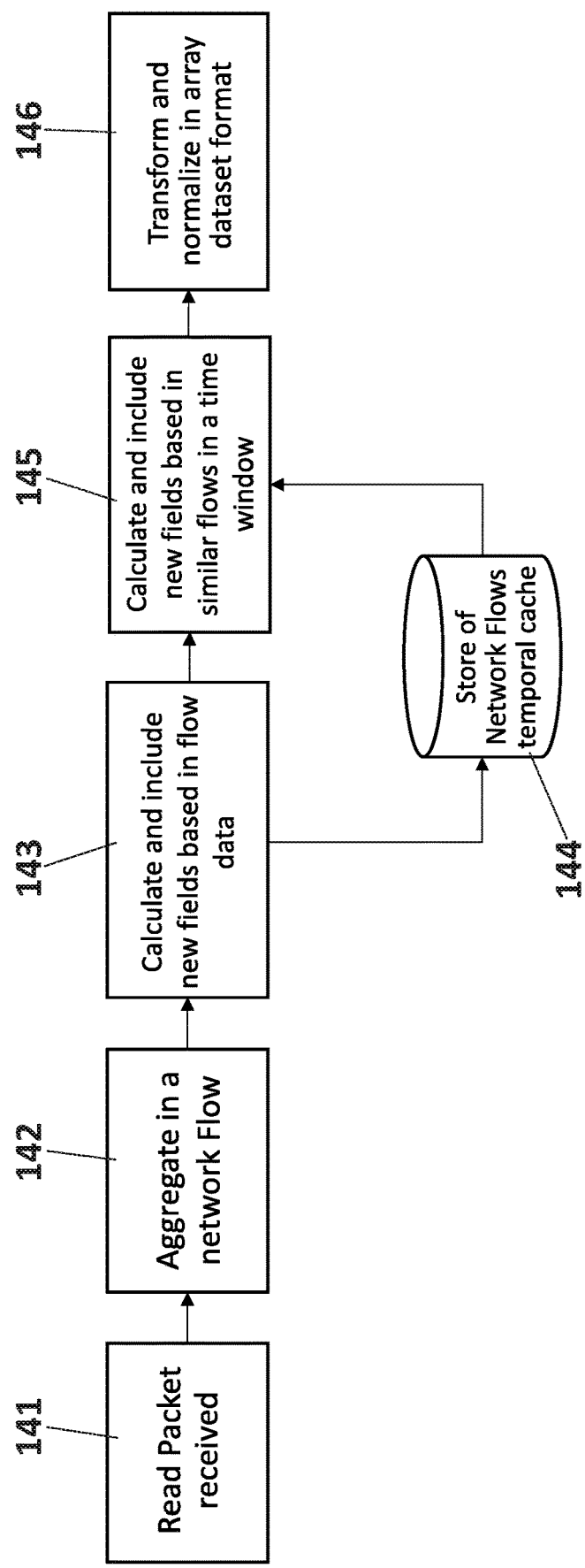
FIG. 4 shows a flow diagram of a feature extraction process in the Probe Module of the system, according to a possible embodiment of the disclosure.

FIG. 4 shows how the data received from the network are transformed to extract the features for the array delivered by the Probe (140) through the interface (181) to the Train and Validation Module (150) for the labelling (400). The probe module (140) receives (141) the whole traffic (121), comprising real traffic and synthetic traffic, in real time from the network. The probe (140) transforms and groups or aggregates (142) these network packets in network flows. For example, network flows can be aggregated by source IP, destination IP, source port, destination port, TCP sequence number, start date and end date. New multiple fields, such as counters of packets per flow, list of protocol flags, average size of bytes, or indeed from the payload content if it is accessible, can be calculated (143) and included into the aggregation of network flows. This is a state of the art process, with multiple existing implementations: Netflow, IPFIX (Internet Protocol Flow Information Export) and sflow are some examples. Next, the probe (140) stores (144) in a historic cache the flow created. This temporary storage can also be used to include additional fields from other previous related flows in a defined time window (145). Some examples can be the number of identical flows (expect start and end date), the average number of packets per flow in the identical flows, the time between identical flows, and any other fields that can be mathematically derived from the historic cache for a period of time in the past. Finally, the network flow with all the calculated fields is transformed in a suitable dataset format (146) for the ML algorithms, usually as an array matrix or table where each aggregated flow is a row and each feature are set in columns with normalized values. All this process is triggered by each packet received (141) from the probe (140) through the interface (121). This means that the dataset values in the output in the final format (146) is updated in real-time for each network flow, and delivered through interface (181), instead of waiting until the flow ends or a timeout triggers the flow as closed. This behavior is leveraged in the Train and Validation module (150), for real-time algorithm validation as the features arrive.

Figure 5:
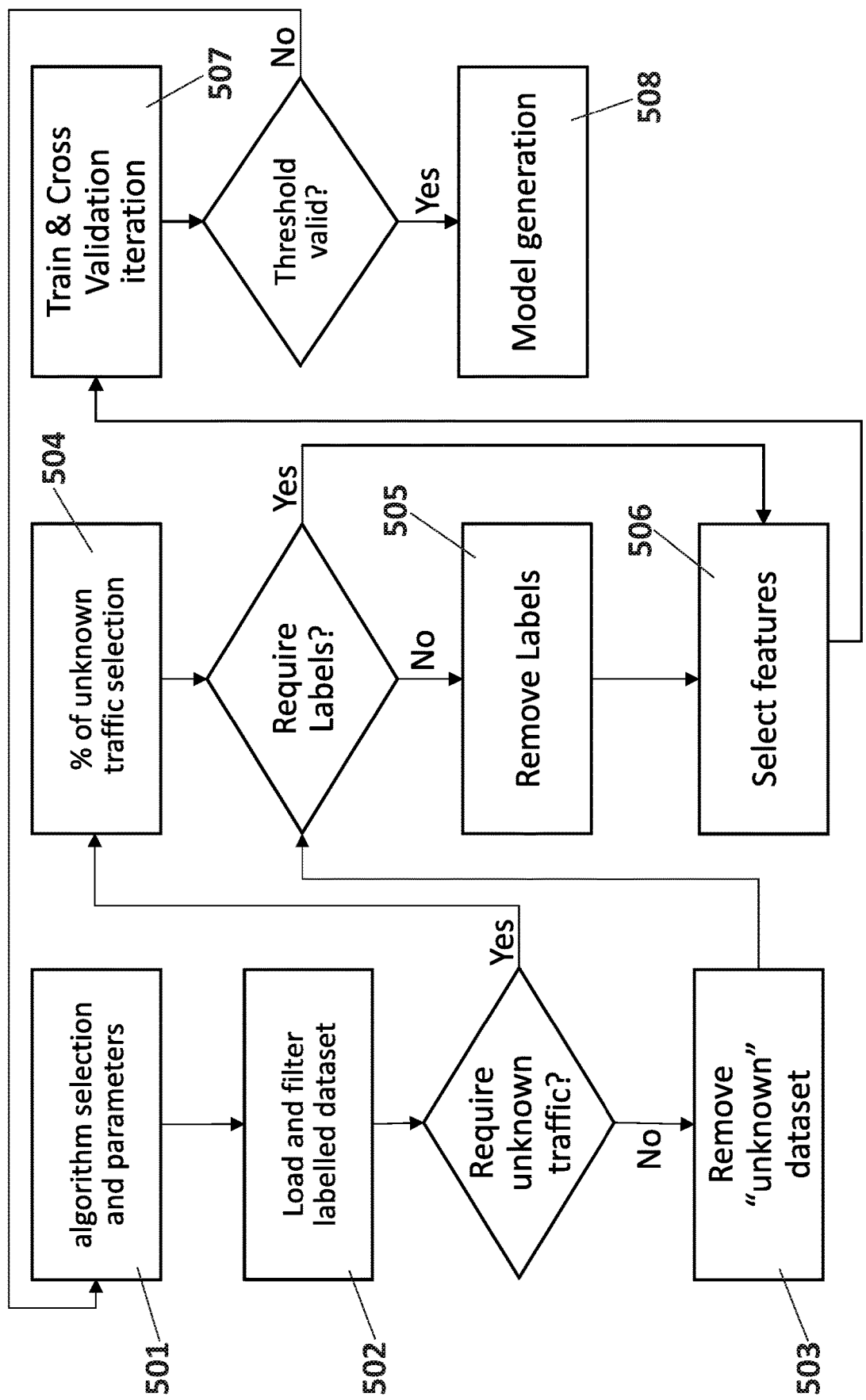
FIG. 5 shows a flow diagram of a training process in the Train and Validation Module of the system, according to a possible embodiment of the disclosure.

FIG. 5 shows the logic of realistic training workflow (2001) performed by the Train and Validation Module (150). In unsupervised ML algorithms, it is not needed to label the traffic for training, but in supervised ML algorithm a labelled array of features must be available. The process starts with a selection (501) of the ML algorithm and the configuration properties needed for the training. These properties are the size and type (real and synthetic) of the dataset to be used, required labels, features definition, and validation parameters and thresholds used to measure the success of the training (e.g. Precision, AuC, accuracy . . . ). Once the experiment is defined, the labeled data from Labelling process output (400) is loaded (502) and cached, depending of the algorithm needs. In real-time validation, a minimum number of packets or a small timeout triggers the next step. In a larger dataset training, the process waits for a longer period of time (with a maximum timeout also), to be sure that the flow ends and related flow statistics are included. If there is no need of it, the part of traffic labelled as unknown is removed (503). On the contrary, if the training process needs a portion of non-categorized traffic, for example in anomaly detection to create a baseline flows, then a part of the real unknown traffic is included (504). The next job in the dataset is the removal (505) or not of the label for the training process, once again depending if supervised or unsupervised algorithm is being trained. Finally, the specific features defined in (501) to be used in the training process are selected (506) and delivered to a train and cross validation iterative process (507). This last step includes the cross validation with the same data, as an accepted process to check if the ML algorithm is good enough to generate an exportable trained model (508) for validation workflow (2002); otherwise, the model needs to be refined and so the training process starts again.

Figure 6:
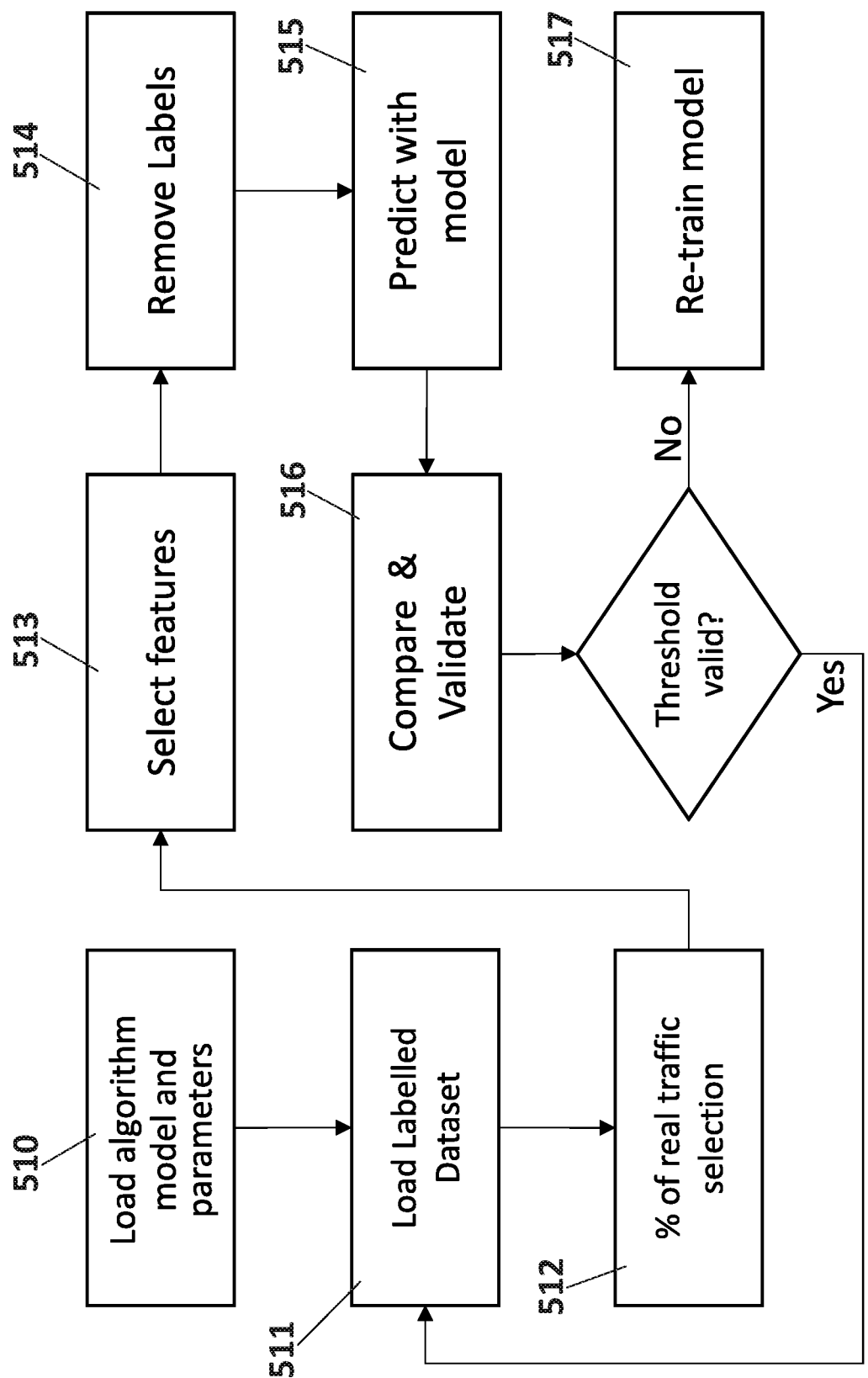
FIG. 6 shows a flow diagram of a continuous validation process in the Train and Validation Module of the system, according to a possible embodiment of the disclosure.

FIG. 6 shows the realistic logic of validation workflow (2002) performed by the Train and Validation Module (150). The model generated by the aforementioned training process is loaded with the parameters (510) of the configuration requirements, including the percentage of real traffic to be included at each iteration and the acceptance threshold in the validation. The data labelled in (405) by the labelling process (400) are loaded (511) as in the training process described before. Based on previous configuration, a part of real traffic is included (512), identified by an "unknown" label, and the features used for this model are selected (513). Labels are removed (514) and a prediction (515) executed for the trained generated model. The prediction (515) output depends of the type of ML algorithm, some examples are, in the case of unsupervised anomaly detectors, a label for each flows indicating if it is an anomaly or not, or in the case of supervised classification identification, a label for each flow indicating if it belongs to a specific category. A comparison (516) between the prediction result with only the flows with known labels before removing them is done for validation. The validation is done in terms of precision, accuracy, AuC, or any other criteria defined in the parameters (510). If the result passes the threshold defined in the parameteres (510), additional traffic can be loaded (511) as it is received, and the part of the real traffic to be added (512) is increased. This process can be executed indefinitely, until some contextual change in the real traffic make the model fall below the acceptance threshold and should be redesigned and re-trained (517).

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for training and validating machine learning algorithms in real network environments wherein real traffic is moving between an internal network and an external network, the method comprising:
   (i) generating synthetic traffic;
   (ii) receiving packets of traffic comprising the real traffic and the generated synthetic traffic;
   (iii) aggregating the packets of the received traffic into network flows by using metadata;
   (iv) transforming each network flow to generate a first dataset with a format readable by a machine learning algorithm, the first dataset comprising features defined by the metadata for each network flow;
   (v) labelling the real traffic and the synthetic traffic to obtain a labelled dataset which comprises the first dataset and additional features defined as labels, wherein the labelling is done by matching features from the first dataset and features collected from the metadata, and assigning an unknown label if there is no match;
   (vi) selecting a subset of the features from the labelled dataset to be used in an iterative training to generate a trained model;
   (vii) filtering out a part of real traffic of the labelled dataset to obtain a second labelled dataset;
   (viii) selecting a subset of features used in the trained model from the second labelled dataset to be used for validating the trained model;
   (ix) comparing predicted results for the trained model and the labels obtained from labelling; and
   (x) if the comparison is negative, repeating steps (v)-(ix) with a different subset of features to generate another trained model.

2. The method according to claim 1, wherein the packets of the received traffic are aggregated by metadata extracted from the packets and selected from the group consisting of source IP address, destination IP address, source port, destination port, TCP sequence number, start date, end date, and any other value of the network packet.

3. The method according to claim 1, wherein the packets of the received traffic are aggregated by metadata calculated and selected from the group consisting of counters of packets per flow, list of protocol flags, average size of bytes, and any other statistical traffic information derived from the aggregation of the packets belonging to the same network flow.

4. The method according to claim 1, further comprising storing in a historic cache the aggregated network flow and including additional metadata from other previous related flows in a defined time window, the additional metadata being selected from the group consisting of number of identical flows, average number of packets per flow in the identical flows, time between identical flows, and any other features mathematically derived from the historic cache for a period of time in the past.

5. The method according to claim 1, further comprising:
   if the machine learning algorithm requires real traffic for training process, including a part of real traffic with the unknown label into the first dataset before selecting the features from the first dataset to be used in the iterative training; and
   otherwise, removing the real traffic labelled with the unknown label from the first dataset.

6. The method according to claim 1, further comprising removing the labels obtained from labelling which are not needed in training process if the machine learning algorithm is unsupervised, before selecting the features from the first dataset to be used in the iterative training.

7. The method according to claim 1, wherein the step of comparing is performed in terms of precision, accuracy, or any other criteria defined by configurable parameters.

8. A system for training and validating machine learning algorithms in real network environments comprising an internal network and an external network providing real traffic through a network device, wherein the system comprises at least one processor and memory configured to perform functions via appropriately encoded instructions in interaction with the network device, by implementing functional components that include:
- at least one generator of synthetic traffic;
- a probe configured for:
  - receiving packets of traffic comprising the real traffic and the generated synthetic traffic through the network device;
  - aggregating the packets of the received traffic into network flows by using metadata; and
  - transforming each network flow to generate a first dataset with a format readable by a machine learning algorithm, the first dataset comprising features defined by the metadata for each network flow;
- a train and validation module comprising:
  - a labeller configured for:
    - (i) labelling the real traffic and the synthetic traffic to obtain a labelled dataset which comprises the first dataset and additional features defined as labels, wherein the labelling is done by matching features from the first dataset and features collected from the metadata, and assigning an unknown label where there is no match; and
  - a feature extractor configured for:
    - (ii) selecting a subset of the features from the labelled dataset to be used in an iterative training to generate a trained model;
    - (iii) filtering out a part of real traffic of the labelled dataset to obtain a second labelled dataset;
    - (iv) selecting a subset of features used in the trained model from the second labelled dataset to be used for validating the trained model; and
  - the train and validation module being further configured for:
    - (v) comparing predicted results for the trained model and the labels obtained from labelling; and, if the comparison is negative, repeating steps (i)-(v) with a different subset of features to generate another trained model.

9. The system according to claim 8, wherein the generator of synthetic traffic is selected from a synthetic user module and a synthetic server.

10. The system according to claim 8, wherein the probe aggregates packets of the received traffic by metadata extracted from the packets and selected from source IP address, destination IP address, source port, destination port, TCP sequence number, start date and end date or any other value of the network packet.

11. The system according to claim 8, wherein the probe aggregates packets of the received traffic by metadata calculated and selected from counters of packets per flow, list of protocol flags, average size of bytes and any other statistical traffic information derived from the aggregation of the packets belonging to the same network flow.

12. The system according to claim 8, further comprising a historic cache for storing the aggregated network flow and including additional metadata from other previous related flows in a defined time window, the additional metadata being selected from number of identical flows, average number of packets per flow in the identical flows, time between identical flows, and any other features mathematically derived from the historic cache for a period of time in the past.

13. The system according to claim 8, wherein the train and validation module is further configured for:
- if the machine learning algorithm requires real traffic for training process, including a part of real traffic with the unknown label into the first dataset before selecting the features from the first dataset to be used in the iterative training;
- otherwise, removing the real traffic labelled with the unknown label from the first dataset.

14. The system according to claim 8, wherein the train and validation module is further configured for removing the labels obtained from labelling which are not needed in training process if the machine learning algorithm is unsupervised, before selecting the features from the first dataset to be used in the iterative training.

15. The system according to claim 8, wherein the train and validation module compares in terms of precision, accuracy, or any other criteria defined by configurable parameters.

* * * * *